US011277075B2

(12) United States Patent
Huang

(10) Patent No.: US 11,277,075 B2
(45) Date of Patent: Mar. 15, 2022

(54) POWER SYSTEM ARCHITECTURE WITH REDUCED COMMON MODE VOLTAGE

(71) Applicant: The Boeing Company, Chicago, IL (US)

(72) Inventor: Jian Huang, Everett, WA (US)

(73) Assignee: The Boeing Company, Chicago, IL (US)

(*) Notice: Subject to any disclaimer, the term of this patent is extended or adjusted under 35 U.S.C. 154(b) by 252 days.

(21) Appl. No.: 16/739,539

(22) Filed: Jan. 10, 2020

(65) Prior Publication Data

US 2021/0218340 A1 Jul. 15, 2021

(51) Int. Cl.
| | |
|---|---|
| *H02M 1/12* | (2006.01) |
| *H02M 5/458* | (2006.01) |
| *H02J 4/00* | (2006.01) |
| *B64D 41/00* | (2006.01) |
| *H01F 30/14* | (2006.01) |
| *H02M 1/42* | (2007.01) |
| *H01F 30/02* | (2006.01) |

(52) U.S. Cl.
CPC .......... *H02M 5/4585* (2013.01); *B64D 41/00* (2013.01); *H01F 30/14* (2013.01); *H02J 4/00* (2013.01); *H02M 1/12* (2013.01); *H02M 1/4216* (2013.01); *B64D 2221/00* (2013.01); *H01F 30/02* (2013.01)

(58) Field of Classification Search
CPC .... H02M 5/4585; H02M 1/12; H02M 1/4216; B64D 41/00; B64D 2221/00; H01F 30/14; H01F 30/02; H02J 4/00
See application file for complete search history.

(56) References Cited

U.S. PATENT DOCUMENTS

| | | | |
|---|---|---|---|
| 6,291,976 B1* | 9/2001 | Kaminski | G06F 1/26 323/267 |
| 7,772,953 B2 | 8/2010 | Huang et al. | |
| 7,772,954 B2 | 8/2010 | Huang et al. | |
| 10,950,382 B1* | 3/2021 | Huang | H02M 7/068 |
| 2019/0348940 A1* | 11/2019 | Li | H02P 25/22 |
| 2021/0098188 A1* | 4/2021 | Huang | H01F 30/14 |

\* cited by examiner

*Primary Examiner* — Adolf D Berhane
(74) *Attorney, Agent, or Firm* — Sage Patent Group

(57) ABSTRACT

An electric power system is provided that includes a three-phase to ten-phase step-up transformer. The transformer includes primary winding groupings, secondary windings, and third windings. The primary winding groupings include sub windings. Primary winding groupings are coupled to form a delta configuration and coupled to secondary windings and third windings, which may also be coupled to each other. The outputs at second ends of secondary windings and third windings are greater than the outputs at the second ends of primary windings. Diode pairs are connected to each other, each diode pair having an inner connection connected to one of the outputs of the transformer and first and second ends respectively connected to a positive dc bus and a negative dc bus. An inverter is connected to the d busses. The diode pairs operatively rectify the transformer output voltage to form a DC voltage with a reduced common mode voltage.

20 Claims, 12 Drawing Sheets

POWER SYSTEM ARCHITECTURE WITH REDUCED COMMON MODE VOLTAGE

The present disclosure relates generally to power systems, and more particularly to transformer topologies that reduce output common mode voltages.

In many applications, especially shipboard and aircraft applications, a high voltage direct current (DC) power is used to power motor controllers. Typically, a three phase alternating current (AC) voltage of 230 Volts RMS (root mean square) of variable frequency is generated. The three phase AC voltage is applied to an auto transformer rectifier unit (ATRU) and rectified to generate a DC voltage of +/−270 Volts on a DC bus. The rectified DC voltage from the ATRU is then used to power motor controllers.

The weight of feeders for delivering power to equipment such as equipment on shipboard and aircraft applications can be a substantial part of the weight of the power system. One of the ways that can decrease the weight is to provide a higher rectified DC voltage. However, the drawback to having a higher rectified DC voltage is there is often increased common mode voltages on the DC bus.

SUMMARY

An electric power system is provided that includes a three-phase to ten-phase step-up transformer, a plurality of sets of diode pairs, and a three phase inverter. The three-phase to ten-phase step-up transformer includes a plurality of primary winding groupings, a plurality of secondary winding windings, and a plurality of third windings. Each primary winding grouping includes a plurality of sub-primary windings coupled in series with a junction of two sub primary windings defining an interior junction, wherein each end of the primary winding grouping is connected to an end of another primary winding grouping to form a delta configuration and a junction of two primary winding groupings defines an input phase connection that receives a phase of a multi-phase input voltage. Each secondary winding has a first end and a second end with a first end coupled to one of the plurality of sub-primary windings and a second end coupled to one of a plurality of third windings or one of ten outputs of the three-phase to ten-phase step-up transformer. Each of the plurality of third windings has a first end and a second end, wherein the first end of a third winding is coupled to a second end of one of the plurality of secondary windings and the second end is coupled to one of the ten outputs of the three-phase to ten-phase step-up transformer. Each of the plurality of secondary windings and the plurality of third windings are configured such that an output voltage at each of the output connections is higher than an input voltage applied to the input phase connection. Each set of diode pairs has a first end, a second end, and an inner connection connecting diodes of the set of diode pairs to each other, each of the plurality of sets of diode pairs having the first end connected to a positive dc bus, the second end connected to a negative dc bus and the inner connection connected to one of the ten outputs of the three-phase to ten-phase step-up transformer. The three phase inverter is connected to the positive dc bus and the negative d bus. The plurality of the sets of diode pairs operatively rectify the output voltage from the three-phase to ten-phase step-up transformer to form a DC voltage on the positive dc bus and the negative d bus with a reduced common mode voltage.

In accordance with another embodiment of inventive concepts, a method is provided to provide three phase power to equipment with reduced common mode voltage on a DC bus of a three phase inverter. The method includes connecting a three-phase to ten-phase step-up transformer to ten sets of diode pairs with each set of diode pairs having a first end, a second end, and an inner connection connecting diodes of the set of diode pairs to each other. The three-phase to ten-phase step-up transformer includes a plurality of primary winding groupings, a plurality of secondary windings, and a plurality of third windings. Each primary winding grouping includes a plurality of sub-primary windings coupled in series with a junction of two sub primary windings defining an interior junction, wherein each end of the primary winding grouping is connected to an end of another primary winding grouping to form a delta configuration and a junction of two primary winding groupings defines an input phase connection that receives a phase of a multi-phase input voltage. Each secondary winding has a first end and a second end with a first end coupled to one of the plurality of sub-primary windings and a second end coupled to one of a plurality of third windings or one of ten outputs of the ten-phase step-up transformer. Each of the plurality of third windings has a first end and a second end, wherein the first end of a third winding is coupled to a second end of one of the plurality of secondary windings and the second end is coupled to one of the ten outputs of the ten-phase step-up transformer. Each of the plurality of secondary windings and the plurality of third windings are configured such that an output voltage at each of the output connections is higher than an input voltage applied to the input phase connection. The method further includes for each output connection of the ten outputs of the three-phase to ten-phase step-up transformer, connecting the output connection to the inner connection of one of the ten sets of diode pairs. The method further includes connecting each first end of the ten sets of diode pairs to each other and to switches of the three phase inverter. The method further includes connecting each second end of the ten sets of diode pairs to each other and to other switches of the three phase inverter, wherein the ten sets of diode pairs operatively rectify the output voltage from the ten-phase step-up transformer to form a DC voltage on the DC bus with a reduced common mode voltage.

One advantage that may be provided by the inventive concepts is that variable frequency 230 Vrms ac is converted to a substantially fixed frequency (e.g., 400 Hz) 230 Vrms efficiently. Another advantage that may be provided is that the reduction in the common mode voltage may eliminate or at least reduce the size of a common mode inductor that is typically used to smooth out the rectified DC voltage on the positive d bus, thereby leading to a reduction in weight.

In one embodiment of the above electric power system inventive concepts and the method inventive concepts, the power source includes a three phase input voltage from a variable frequency constant voltage generator, wherein each input phase connection of the three-phase to ten-phase step-up transformer operatively receives a phase from the variable frequency constant voltage generator.

In another embodiment of the above electric power system inventive concepts and the method inventive concepts, an input bus breaker is connected between the power source and the input phase connection of the three-phase to ten-phase step-up transformer.

In yet another embodiment of the above electric power system inventive concepts and the method inventive concepts, a first transfer bus is operatively connected to an output of the three phase inverter and to at least one electric power load and a second transfer bus is connected between the output bus and at least one second electric power load.

In yet another embodiment of the above electric power system inventive concepts and the method inventive concepts, an output bus breaker is connected between the first transfer bus and the output of the three phase inverter.

In a further embodiment of the above electric power system inventive concepts and the method inventive concepts, a second three-phase to ten-phase step-up transformer is included. The second three-phase to ten-phase step-up transformer includes a plurality of sets of second diode pairs with each set of second diode pairs having a second first end, a second second end, and a second inner connection, each of the plurality of sets of second diode pairs having the second first end connected to a second positive dc bus, the second second end connected to a second negative dc bus and the second inner connection connected to one of the ten outputs of the second three-phase to ten-phase step-up transformer. The second three-phase to ten-phase step-up transformer further includes a second three phase inverter connected to the second positive dc bus and the second negative d bus.

In a further embodiment of the above electric power system inventive concepts and the method inventive concepts with the second three-phase to ten-phase step-up transformer, a second transfer bus is connected between an output of the second three phase inverter and at least one electric power load.

In a further embodiment of the above electric power system inventive concepts and the method inventive concepts with the second three-phase to ten-phase step-up transformer, at least one transfer bus breaker is connected between an output bus breaker connected to each output phase of the three phase inverter and the second transfer bus.

In a further embodiment of the above electric power system inventive concepts and the method inventive concepts with the second three-phase to ten-phase step-up transformer, a second output bus breaker is included, the second output bus breaker connected between the each output phase of the second three phase inverter and the second transfer bus.

In yet a further embodiment of the above electric power system inventive concepts and the method inventive concepts with the second three-phase to ten-phase step-up transformer, a second power source comprising a second three phase input voltage from a second variable frequency constant voltage generator is included, wherein each input phase connection of the second three-phase to ten-phase step-up transformer operatively receives a phase from the second variable frequency constant voltage generator.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 1:
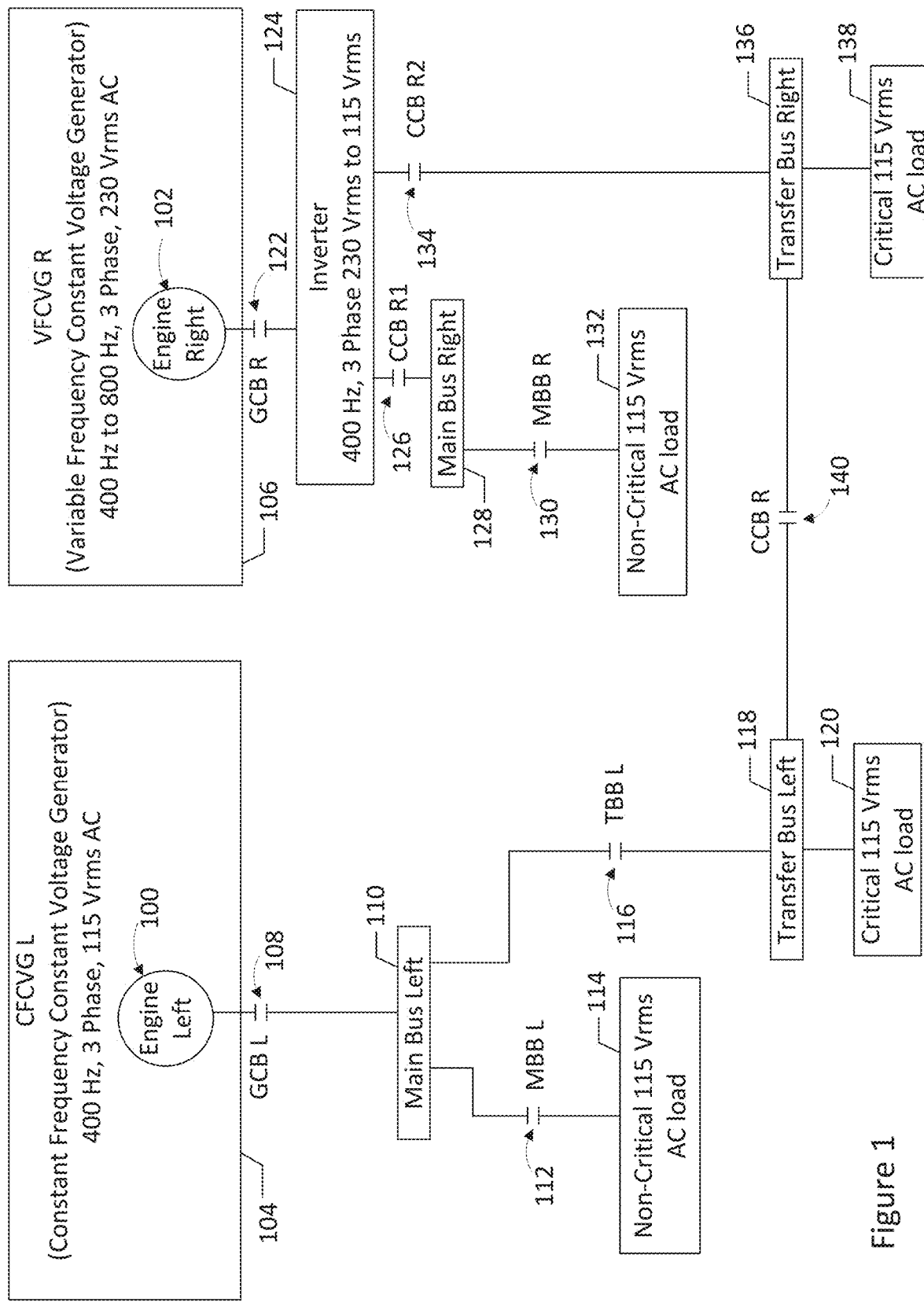
FIG. 1 is an illustration of a power system architecture providing 115 Vrms ac to critical and non-critical loads according to some embodiments.

Turning to FIG. 1, an exemplary ship or airplane configuration having left engine 100 and right engine 102 can be a constant frequency constant voltage (CFCV) generator 104 or variable frequency constant voltage (VFCV) generator 106 to be used as power sources. In FIG. 1, left engine 100 is a CFCV generator 104 and outputs CFCV and right engine 102 is a VFCV generator 106 and outputs VFCV. Left engine 100 and right engine 102 may be either a VFCV generator outputting VFCV or a CFCV generator outputting CFCV.

CFCV generators in airplane configurations may be at 400 Hz and be a 3 phase, alternating current (ac) Vrms (voltage root mean square) at a voltage of 115 Vrms. The CFCV power output in FIG. 1 is provided via bus breaker 108 to main bus left 110. The main bus left 110 provides power via bus breaker 112 to non-critical electric power loads such as non-critical 115 Vrms load 114. The main bus left 110 also provides power via transfer bus breaker 116 to transfer bus left 118, which provides power to critical electric power loads such as critical 115 Vrms ac loads 120. The non-critical 115 Vrms ac loads may be loads such as galley lights, food heating equipment, etc. The critical 115 Vrms ac loads (e.g., critical 115 Vrms ac loads 120 and critical 115 Vrms ac loads 138) may be loads that require backup sources, such as platform controls, engine controls, etc. The configuration of FIG. 1 provides backup via transfer bus left 118 and transfer bus right 136 via bus breaker 140.

VFCV generators in airplane configurations may be at a frequency range of approximately 400 Hz to 800 Hz and be a 3 phase, ac Vrms at a voltage of 230 Vrms. The VFCV power output in FIG. 1 is provided via a breaker 122 to an inverter 124 that converts the VFCV generator power output to 400 Hz, 115 Vrms power. The output power of the inverter 124 provides power via bus breaker 126 to main bus right 128. The main bus right 128 provides power via main bus breaker 130 to electric power loads such as non-critical 115 Vrms ac load 132. The output of the inverter 124 also provides power via bus breaker 134 to transfer bus right 136, which provides power to critical electric power loads such as critical 115 Vrms ac load 138. The configuration of FIG. 1 provides backup via transfer bus left 118 and transfer bus right 136 via breaker 140.

Figure 2:
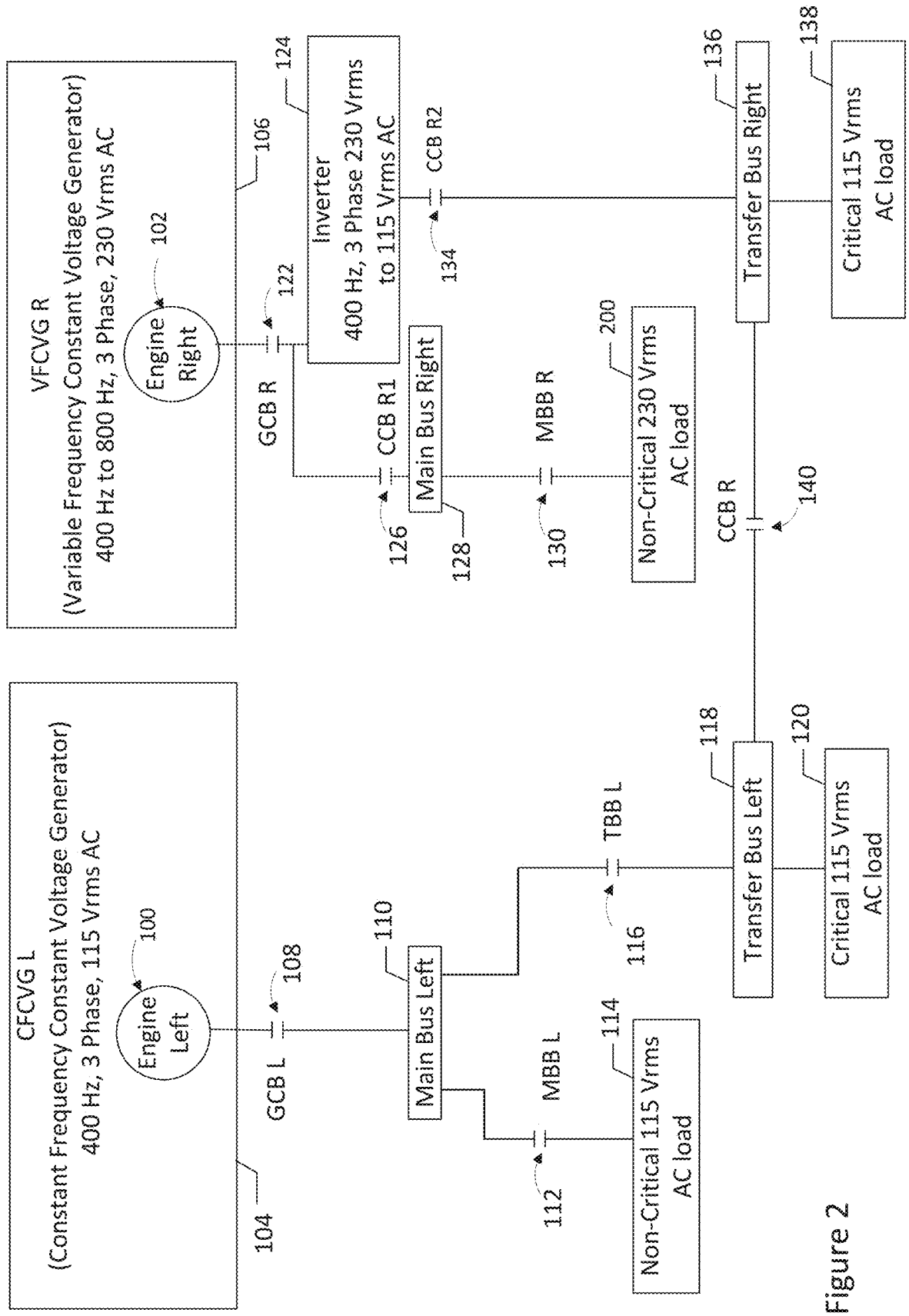
FIG. 2 is an illustration of a power system architecture providing 115 Vrms ac to critical and non-critical loads and 230 Vrms ac to non-critical 230 Vrms ac loads according to some embodiments.

FIG. 2 illustrates a different configuration where non-critical 230 Vrms ac load 200 is used. In FIG. 2, the main bus right 128 receives the 230 Vrms ac power from VFCV generator 106 via bus breaker 122 and bus breaker 126. The main bus right 128 provides electric power to the non-critical 230 Vrms ac load 200 via bus breaker 130.

Figure 3:
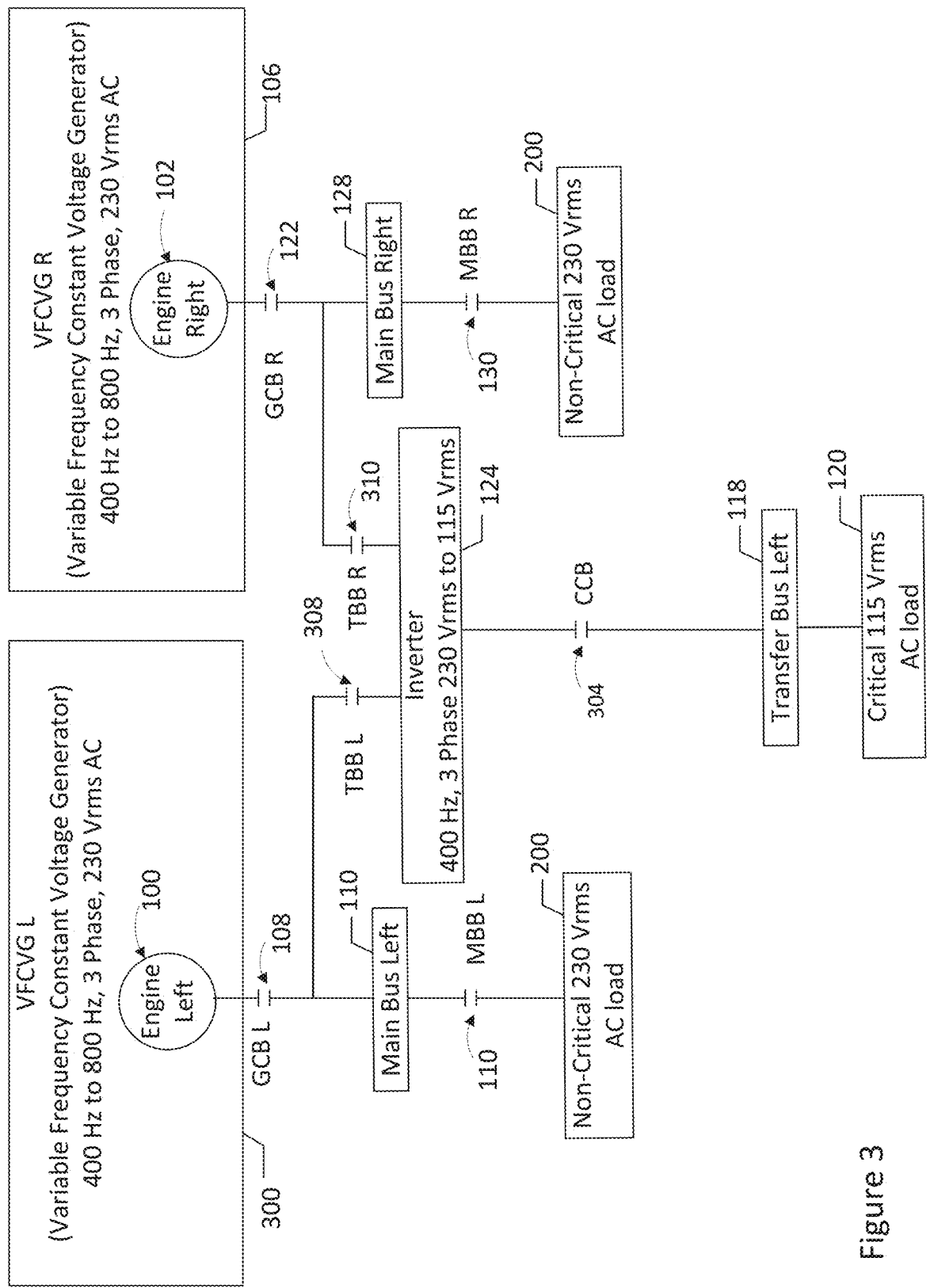
FIG. 3 is an illustration of a power system architecture using variable frequency constant voltage sources to provide 115 Vrms ac to critical 115 Vrms ac loads and 230 Vrms ac to non-critical 230 Vrms ac loads according to some embodiments.

FIG. 3 illustrates a different configuration where non-critical 230 Vrms ac load 200 is provided by both left engine 100 and right engine 102. Thus, in the embodiment of FIG. 3, left engine 100 is a VFCV generator 300 outputting VFCV and right engine 102 is a VFCV generator 106 outputting VFCV. In FIG. 2, the main bus right 128 receives the 230 Vrms ac power from VFCV generator 106 via bus breaker 122 and bus breaker 126. The main bus right 128 provides power to the non-critical 230 Vrms ac load 200 via bus breaker 130. The inverter 124 receives power from left engine 100 via bus breaker 108 and transfer bus breaker 308. The inverter 124 also receives power from right engine 102 via bus breaker 122 and transfer bus breaker 310. The power output of inverter 124 is provided to critical 115 Vrms ac load 120 via bus breaker 304 and transfer bus left 118.

Figure 4:
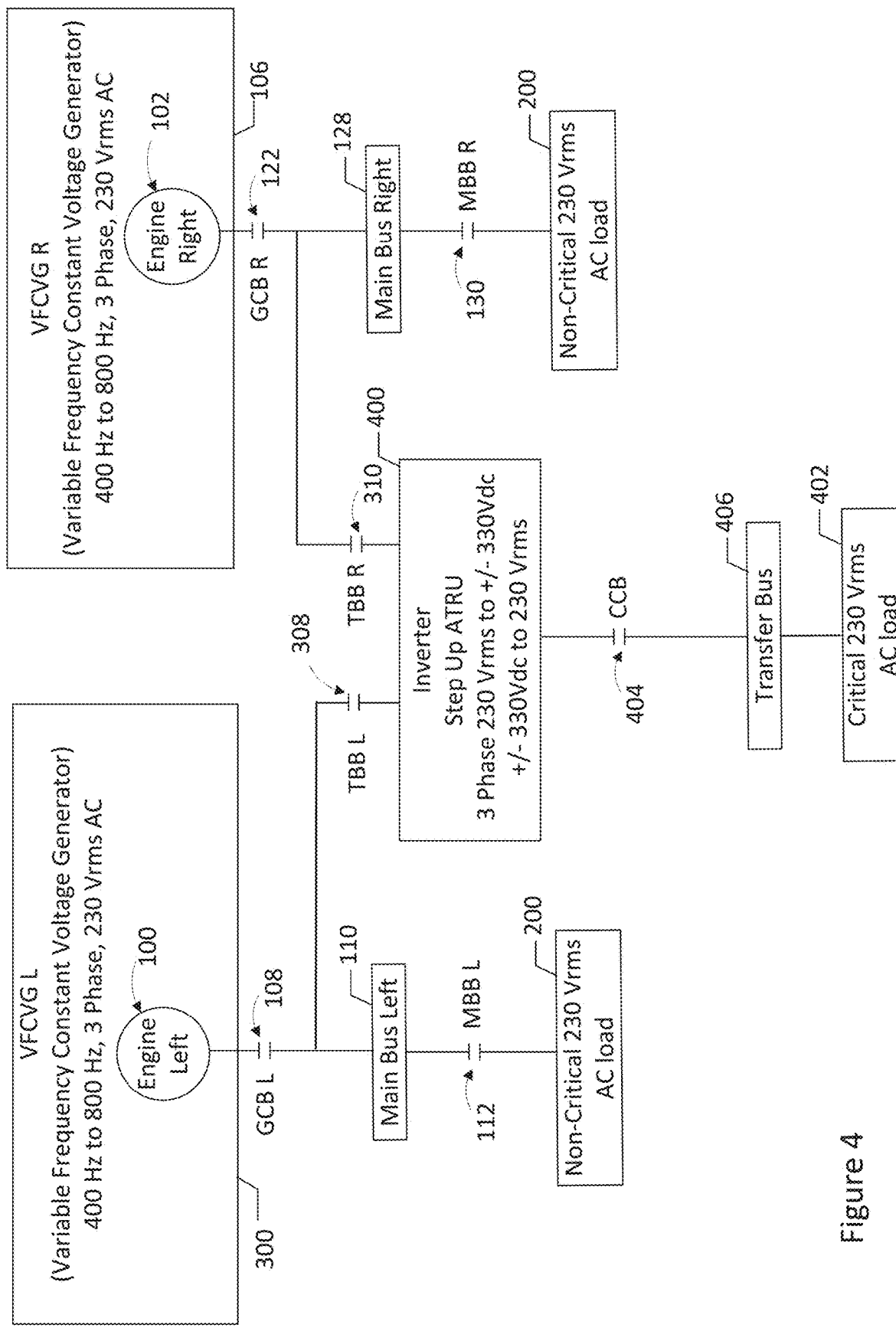
FIG. 4 is an illustration of a power system architecture using variable frequency constant voltage sources to provide 230 Vrms ac to critical and non-critical 230 Vrms ac loads according to some embodiments of inventive concepts.

FIG. 4 illustrates an embodiment where critical 230 Vrms ac load 402 at 400 Hz is provided via bus breaker 404 and transfer bus 406 by an inverter with step up auto transformer rectifier unit (ATRU) 400 that utilizes a step up auto transformer rectifier unit to step up the input voltage to the level required to achieve 400 Hz, 230 Vrms ac.

Figure 5:
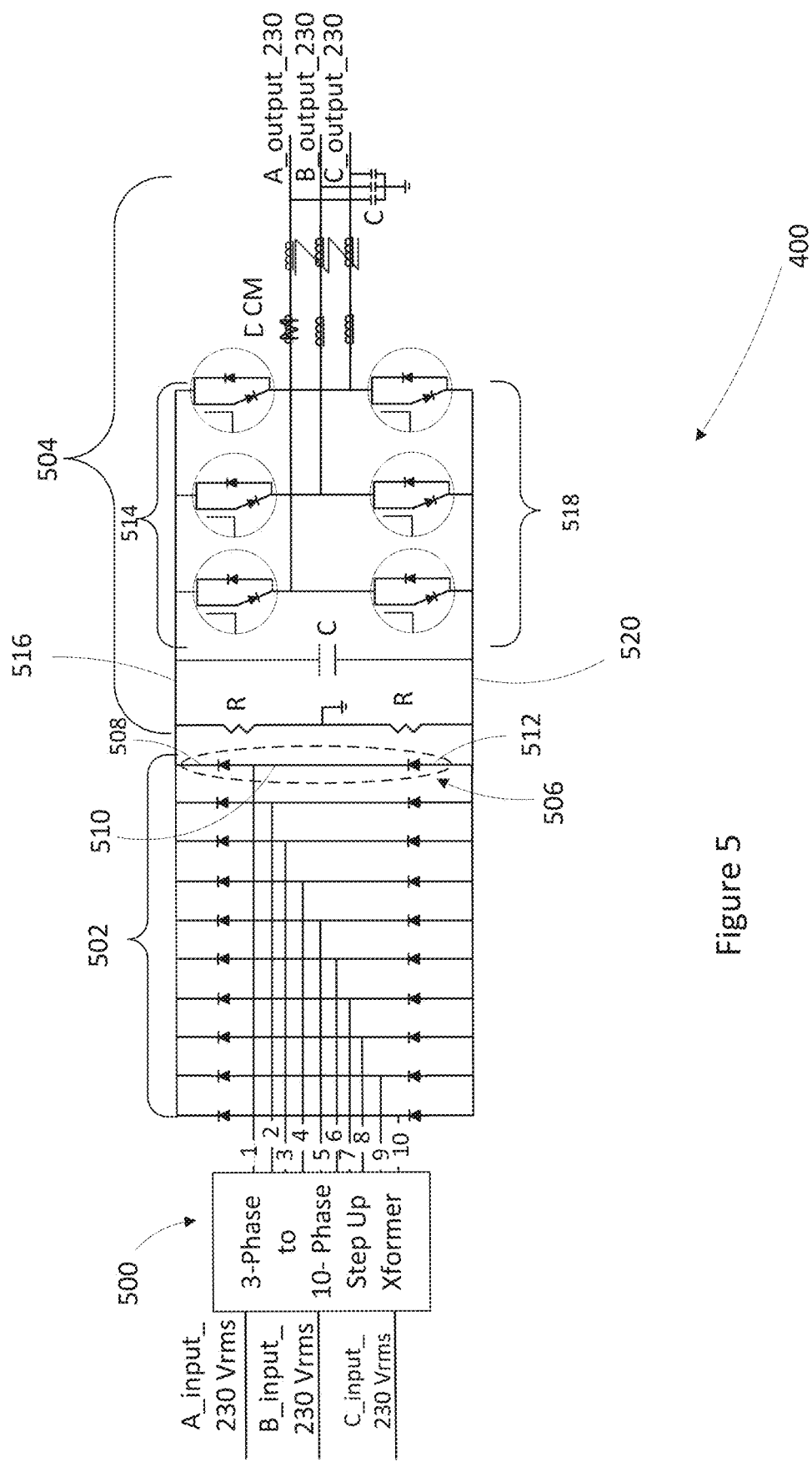
FIG. 5 is an illustration of an inverter topology to provide 230 Vrms ac to critical loads according to some embodiments of inventive concepts.

Turning to FIG. 5, the inverter step up ATRU 400 includes a three-phase to ten-phase step up transformer 500, a plurality of sets of diode pairs 502 and an inverter 504. Each diode pair 506 in the plurality of sets of diode pairs 502 has a first end 508, an inner junction 510, and a second end 512.

The inverter 504 has switches 514 connected to a positive DC bus 516 and switches 518 connected to a negative DC bus 520.

Figure 6:
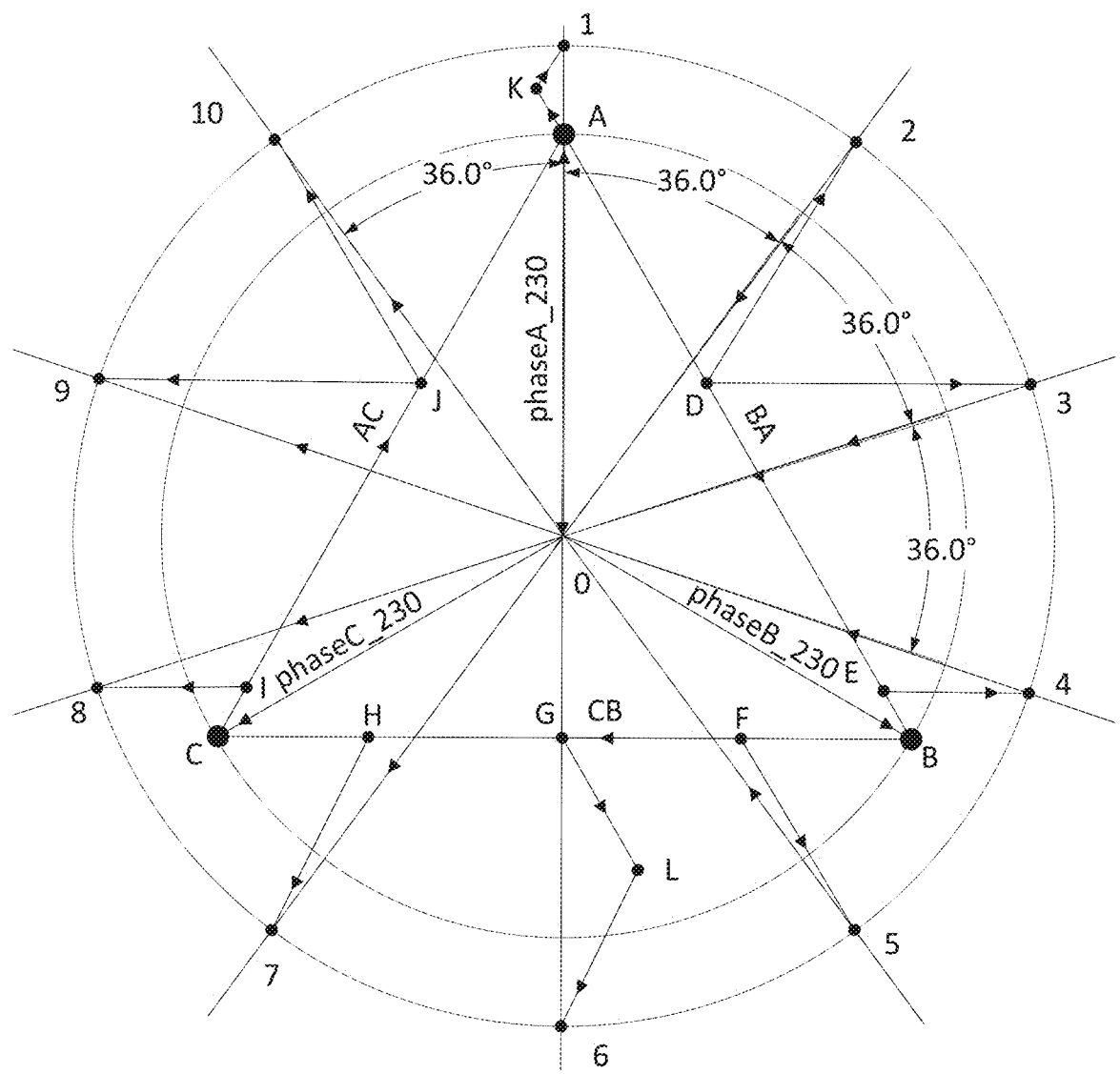
FIG. 6 is an illustration of step-up transformer phasor diagram according to some embodiments of inventive concepts.
Figure 8:
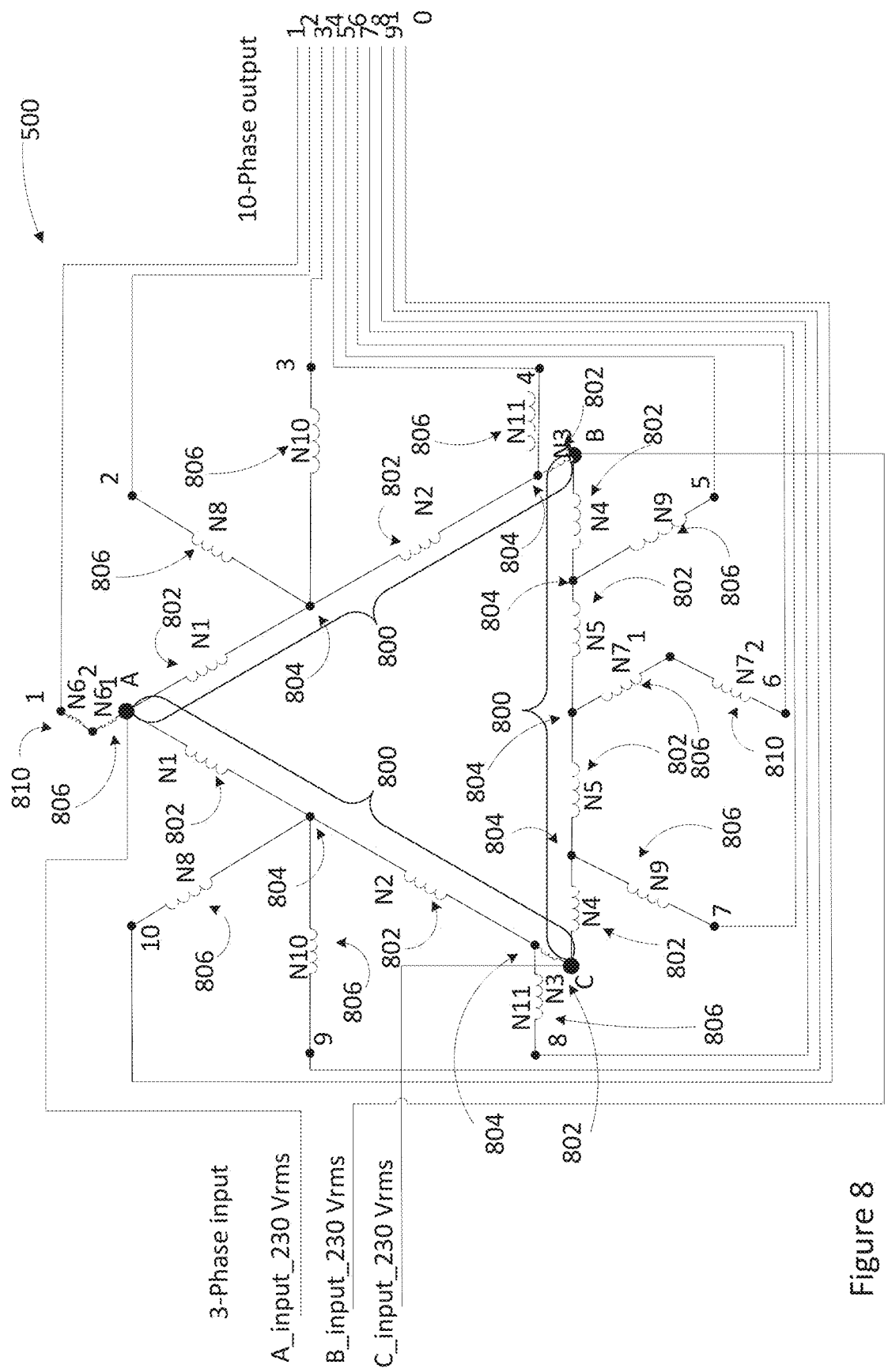
FIG. 8 is an illustration of three-phase to ten-phase step up transformer topology according to some embodiments of inventive concepts.

Turning to FIG. 6, a three-phase to ten-phase step-up transformer topology phasor is illustrated for the three-phase to ten-phase step up transformer 500. For a ten-phase output, the phases are thirty-six degrees apart. With ten-phases instead of a traditional multiple of three phases, there are fewer windings and ten-phases when rectified produces the DC voltage magnitude required to produce 230 Vrms ac output with reduced common mode voltage that may reduce the size of the common mode inductor or eliminate the common mode inductor that is often used in inverters. In FIG. 6, the input phase connections are at A, B, and C. Each winding of the three-phase to ten-phase step up transformer 500 should be in parallel with one of lines AC, AB, or BC. This can increase magnetic coupling of the windings. The length of each line in FIG. 6 is proportional to the number of turns of a winding. For example, a winding that is located between points A and J should have the same number of turns as a winding that is located between points A and D whereas a winding that is located between point J and output 9 can have the same number of turns as a winding between point D and output 3. Additionally, the total number of winding turns of windings located between points A and B has the same total number of winding turns of windings between points B and C and between points C and A. Turning briefly to FIG. 8, this means that the total number of turns in windings N1, N2 and N3 is the same as the total number of turns in windings N4, N5, N5, and N4 (i.e., the total number of turns in 2 N4 windings and 2 N5 windings).

Figure 7A:
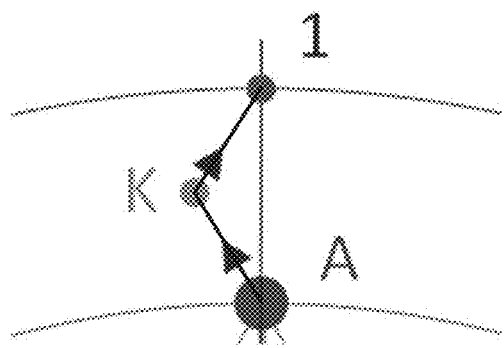
FIGS. 7a-7c is an illustration of using a phasor diagram of a three-phase to ten-phase set-up transform topology to determine the number of windings and winding turns according to some embodiments of inventive concepts.
Figure 7B:
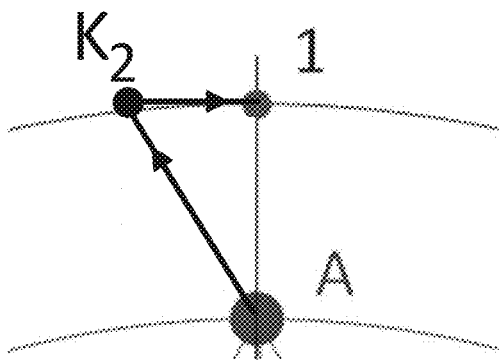
Figure 7C:
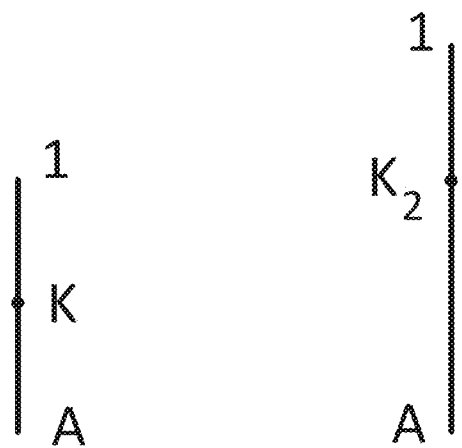

Returning to FIG. 6, each winding connected to one of the ten outputs, labeled in FIGS. 6 and 8 as 1 to 10, should be designed to have a minimum number of turns. With the windings having a minimum number of turns, the overall weight of the transformer 500 will be minimized. As previously indicated, the length of a line in FIG. 6 is proportional to the number of turns of the winding represented by the line. Thus, each line in FIG. 6, which must be parallel to one of lines AC, AB, and BC or be a part of the windings represented by the total length of lines AC, AB, or BC. FIGS. 7a-7c illustrated a method of minimizing the line length. Turning to FIGS. 7a and 7b, the possible lines that go from point A to point 1 can be lines that go from A to K to 1 or lines that go from A to $K_2$ to 1. In FIG. 7A, the line from point A to K and from point A to $K_2$ is parallel to line AB and the line from point K to 1 is parallel to line AC. The line from $K_2$ to 1 is parallel to line BC. FIG. 7c illustrates the total line lengths of the lines in FIG. 7a and the lines in FIG. 7b. As can be seen in FIG. 7c, the total line length of the lines in FIG. 7a are smaller than the total line length of the lines in FIG. 7b. Thus, the windings chosen to go from point A to point 1 are the windings represented by the lines in FIG. 7a. As can be seen in FIG. 6, the minimum line lengths of windings connected to outputs 2 to 5 and 7 to 10 are straight lines in parallel with one of lines AB, AC, or BC. The lines going from point G to L to output 6 are in parallel with lines AB and AC, respectively. The lines could have been chosen to go from G to another point (not shown) that is parallel with line AC instead of AB.

Figure 10:
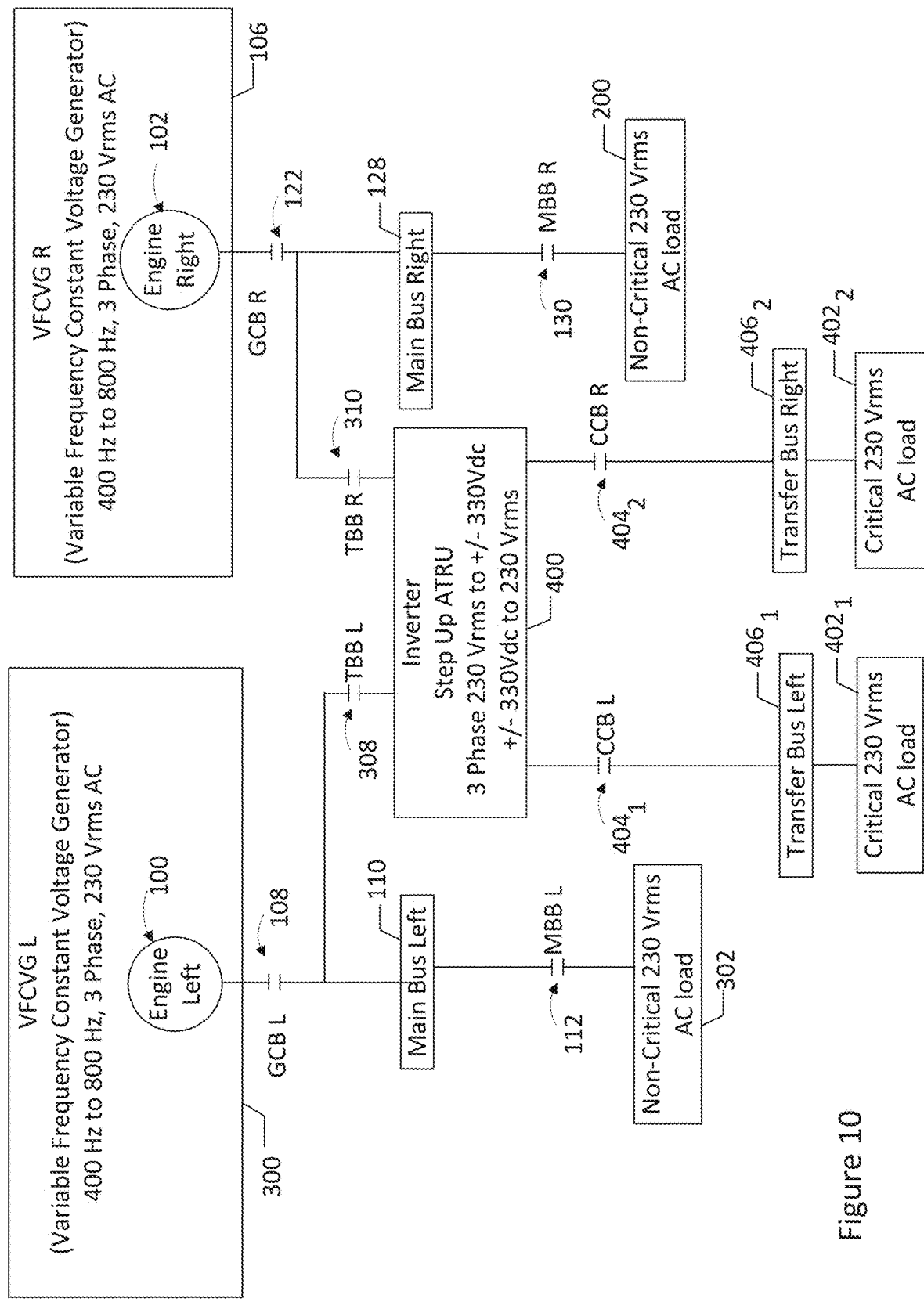
FIG. 10 is an illustration of a power system architecture with one inverter using variable frequency constant voltage generators to provide 230 Vrms ac to critical and non-critical 230 Vrms ac loads with left and right transfer busses being isolated according to some embodiments of inventive concepts.

Turning to FIG. 8, a three-phase to ten-phase transformer 500 based on the phasor diagram of FIG. 6 is illustrated. Windings represented by winding N1, winding N2, and winding N3 or windings represented by winding N4, winding N5, winding N5, and winding N4 collectively form a primary winding grouping 800. Each of winding N1, winding N2, winding N3, winding N4, and winding N5 are sub-primary windings 802. Winding N1, winding N2, and winding N3 are sub-primary windings 802 coupled in series with a junction of two sub primary windings 802 defining an interior junction 804 and winding N4, winding N5, winding N5, and winding N4 are sub-primary windings 802 coupled in series with a junction of two sub primary windings defining an interior junction 804. Each end of a primary winding grouping 800 is connected to an end of another primary winding grouping to form a delta configuration. A junction of two primary winding groupings 800 defines an input phase connection (illustrated at points A, B, and C) that receives a phase of a multi-phase input voltage. Each input phase connection is connected to receive a phase of the multi-phase input voltage. For example, the multi-phase input voltage can be a three phase input voltage such as three phase 230 Vrms ac from a selected variable frequency constant voltage generator 106, 300 with each phase of the three phases of the VFCV generator 106, 300 connected to a different one of the input phase connections. When there are multiple power sources such as three-phase voltages of multiple variable frequency constant voltage generators (as illustrated in FIG. 10), a controller (not shown) selects which VFCV generator 106, 300 is connected to the input phase connections of the three-phase to ten-phase step up transformer 500 of the inverter step up ATRU 400 and controls transfer bus breakers 308, 310 and bus breakers 108, 122 connected between the power source (i.e., VFCV generators 106, 300) and the input phase connections of the three-phase to ten-phase step up transformer 500 to connect each phase of the selected VFCV generator 106, 300 to one of the input phase connections. Thus, each input phase connection is connected to operatively receive a phase from the selected VFCV generator 106, 300 that each provide a three-phase input voltage to the input phase connections when selected. In other words, the multi-phase input voltage is a three phase input voltage from one of a plurality of variable frequency constant voltage generators (e.g., VFCV generators 106, 300) and each input phase connection is connected to receive a phase from a selected one of the variable frequency constant voltage generators.

Windings represented by winding $N6_1$, winding $N7_1$, winding N8, winding N9, winding N10, and winding N11 are secondary windings 806. Each secondary winding 806 has a first end and a second end with a first end coupled to one of the plurality of sub-primary windings 802 and a second end coupled to one of a plurality of third windings 810 or one of the ten outputs of the ten-phase step-up transformer. For example, winding N8 has a first end coupled to sub-primary winding N1 (and sub-primary winding N2) and a second end coupled to one of the ten outputs of the ten-phase step-up transformer (e.g., one winding N8 connected to output 2 and another winding N8 connected to output 10).

Windings represented by winding N62 and winding N72 are third windings 810. Each third winding 810 has a first end and a second end. The first end of a third winding 810 is coupled to a second end of one of the plurality of secondary windings and the second end is coupled to one of the ten outputs of the ten-phase step-up transformer. For example, winding N72 is coupled at one end to secondary winding $N7_1$ and at another end to output 6. Each of the plurality of secondary windings and the plurality of third windings are configured such that an output voltage at each of the output connections 1-10 is higher than an input voltage applied to the input phase connection A, B, or C. For example, when 230 Vrms ac is applied to the input phase connections A, B, and C, the output voltage at the output connections 1-10 are at a higher voltage than the input voltage applied to the input phase connections A, B, and C.

Figure 9:
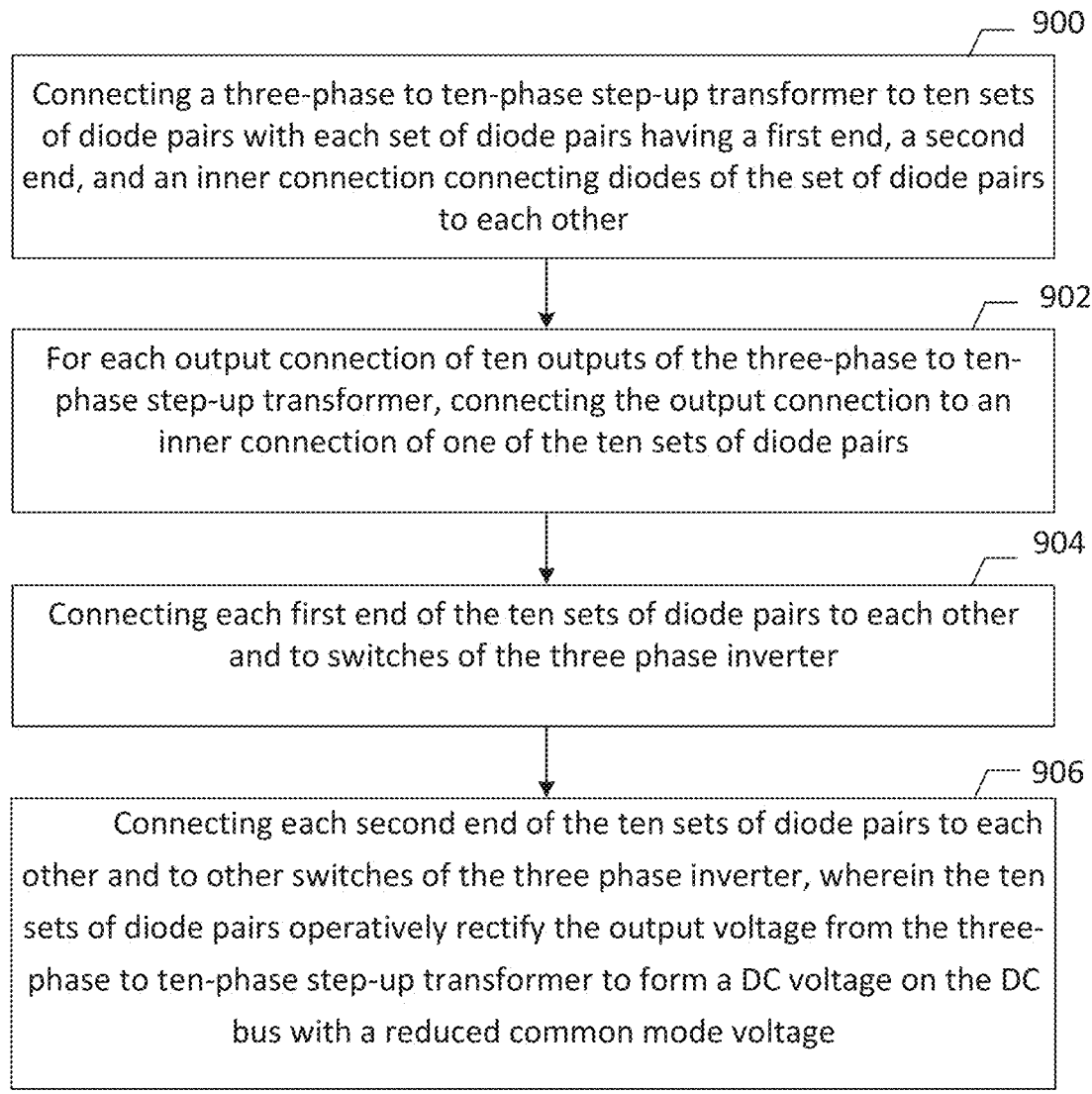
FIG. 9 is a flow chart illustrating operations to provide three phase power to equipment with reduced common mode voltage on a DC bus of a three phase inverter according to some embodiments of inventive concepts.

Turning now to FIG. 9, an embodiment of building the inverter ATRU 400 shall now be described. The three-phase to ten-phase step up transformer 500 described above is connected to a plurality of sets of diode pairs 502 in block 900 where each diode pair 506 has a first end 508, an inner junction 510, and a second end 512. For each output connection of the ten output connections of the three-phase to ten-phase step-up transformer 500, the output connection is connected to an inner junction 510 of one of the ten sets of diode pairs. For example, as shown in FIG. 5, ten sets 502 of diode pairs 506 are connected to the ten outputs of the three-phase to ten-phase step up transformer 500. At block 904, each first end 508 of the ten sets of diode pairs 506 are connected to each other and to switches 514 of three phase inverter 504 and form a positive DC bus 516. At block 906, each second end 512 of the tens sets of diode pairs 506 are connected to each other and to other switches 518 of the three phase inverter 504 and form a negative DC bus 520. During operation, the ten sets 502 of diode pairs 506 receive the output voltages at the output connections 1-10 of the three-phase to ten-phase step up transformer 500 and rectify the output voltages to form a DC voltage on the positive DC bus 516 and negative DC bus 520 with a reduced common mode voltage. During operation the three-phase inverter 504 converts the DC voltage on the positive DC bus and negative DC bus to 230 Vrms ac as know by those skilled in the art.

Turning now to FIG. 10, the inverter step up ATRU 400 including the three-phase to ten-phase transformer 500, ten sets of diode pairs 502, and three phase inverter 504 is installed in an aircraft platform in one embodiment where the power source providing the multi-phase input voltage is a three phase input voltage from one of a plurality of variable frequency constant voltage (VFCV) generators 106, 300. Each input phase connection (A; B; C) of the three-phase to ten-phase step up transformer 500 is connected to a phase of one the VFCV generators 106, 300 via an input bus breaker (e.g., transfer bus breaker 308 and bus breaker 108 or transfer bus breaker 310 and bus breaker 122) connected between the power source and the input phase connection of the three-phase to ten-phase step up transformer 500 such that each input phase operatively receives a phase from one of the VFCV generator 106, 300. Each output phase of the three phase inverter 504 is connected to an output bus (e.g., transfer bus left $406_1$ and/or transfer bus right $406_2$) via an output bus breaker $404_1$, $404_2$ that are each connected to the output phases of the three phase inverter 504 and the respective output bus. Controlling the output bus breakers $404_1$ and $404_2$ operatively connect power to the output bus (e.g., transfer bus left $406_1$ or transfer bus right $406_2$) and the at least one electric power load such as critical 230 Vrms ac load $402_1$ and/or critical 230 Vrms ac load $402_2$ such that power is provided to the at least one load depending on which output bus breakers $404_1$, $404_2$ are closed. When there are multiple output busses (e.g., transfer bus left $406_1$ and transfer bus right $406_2$), when one of the at least one transfer bus is operatively connected to the three-phase inverter output, power is provided to the at least one electric power load connected to the one of the at least one transfer bus.

Figure 11:
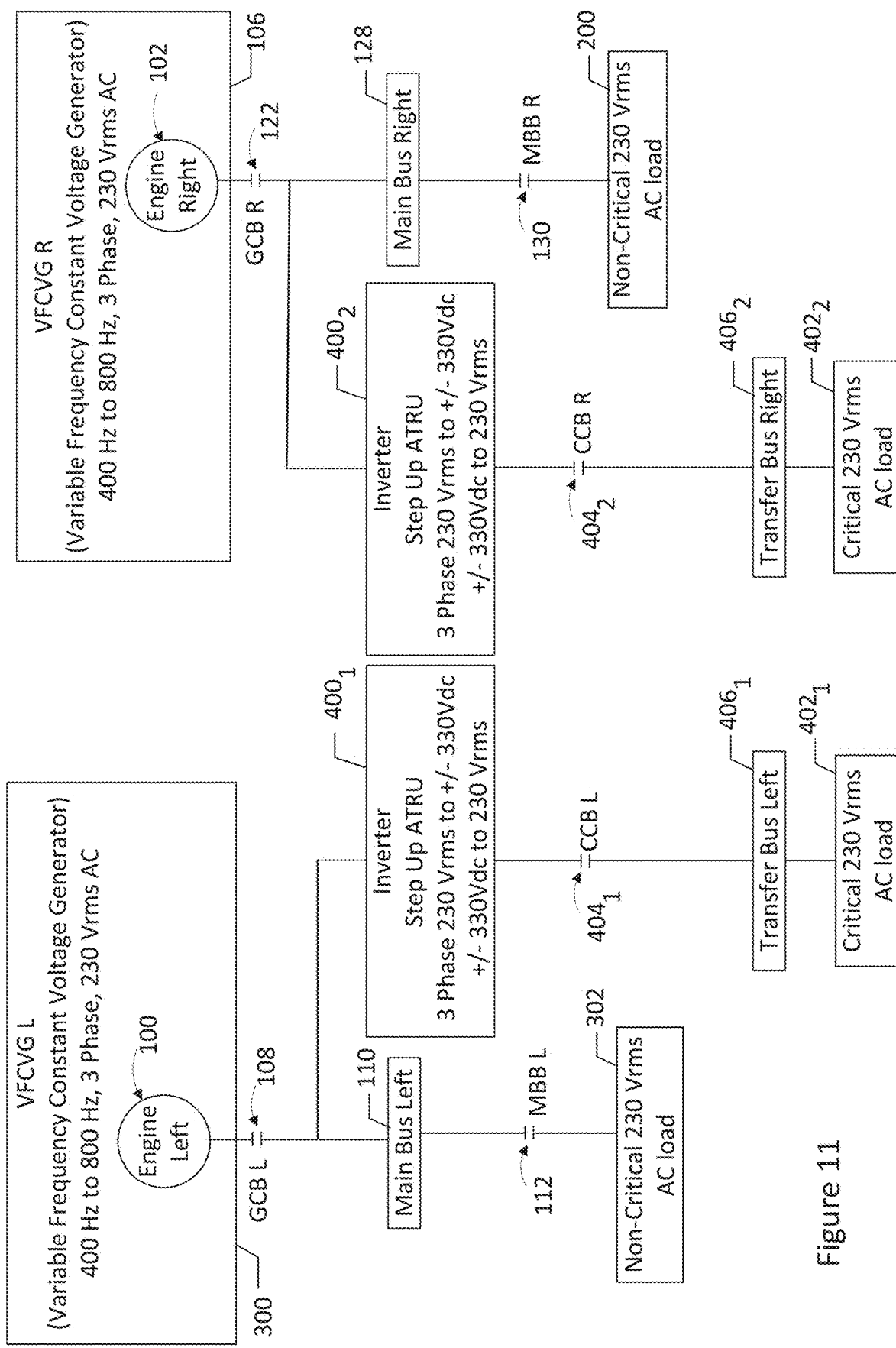
FIG. 11 is an illustration of a power system architecture with two inverters using variable frequency constant voltage generators to provide 230 Vrms ac to critical and non-critical 230 Vrms ac loads with left and right transfer systems being isolated according to some embodiments of inventive concepts.
Figure 12:
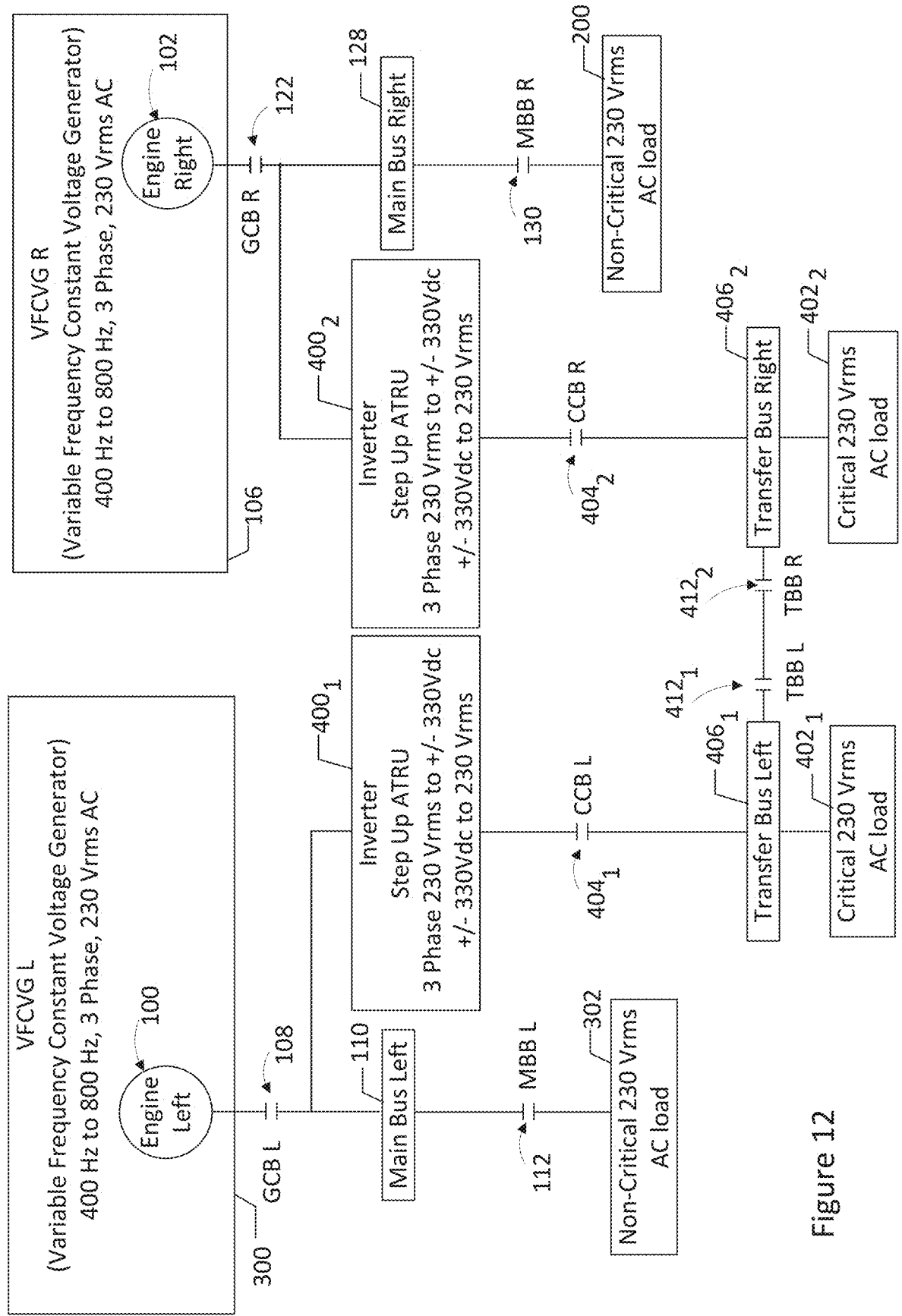
FIG. 12 is an illustration of a power system architecture with two inverters using variable frequency constant voltage generators to provide 230 Vrms ac to critical and non-critical 230 Vrms ac loads with left and right transfer buses backing up to each other according to some embodiments of inventive concepts.

Turning now to FIGS. 11 and 12, in some embodiments, a second three-phase to ten-phase step-up transformer $400_2$ is provided that is connected to ten sets of second diode pairs with each set of second diode pairs having a first end, a second end, and an inner connection connecting diodes of the set of diode pairs to each other. For each output of the ten outputs of the second three-phase to ten-phase transformer, the output is connected to an inner connection of one of the ten sets of second diode pairs. Each first end of the ten sets of second diode pairs are connected to each other and to switches of the second three phase inverter to form a second positive dc bus. Each second end of the ten sets of second diode pairs are connected to each other and to other switches of the second three phase inverter to form a second negative d bus. Each output phase of the second three phase inverter is connected to a second output bus (e.g., transfer bus right $408_2$) via at least one output bus breaker (i.e., a contactor) $406_2$ to provide electric power to electric power loads such as equipment (i.e., critical 230 Vrms ac load $410_2$) operatively connected to the second output bus (e.g., transfer bus right $408_2$). When two inverter step up ATRUs are provided, each input connection of each the three-phase to ten-phase transformers 500 of the two inverter step up ATRUs 400 is connected to one of the VFCG generators 106, 300 via an input bus breaker (e.g., bus breaker 108 or bus breaker 122) and to respective electric power loads $402_1$, $402_2$ via an output bus breaker (e.g., bus breaker $404_1$ or bus breaker $404_2$) connected to each output phase of the three phase inverter 504 of the inverter step up ATRU 400 and to output bus (e.g., transfer bus left $406_1$ or transfer bus right $406_2$).

Turning to FIG. 12, the inverter step up ATRUs $400_1$, $400_2$ can be used as a backup to each other such that if one inverter ATRU is taken off-line or has failed, the critical 230 Vrms ac electric power loads may be provided power via transfer bus breakers $412_1$, $412_2$. For example, if inverter ATRU $400_2$ is not operating (e.g., taken off line or has failed), the controller (not shown) opens breaker $404_2$ and closes each of the transfer bus breakers $412_1$, $412_2$ to provide power to critical 230 Vrms ac load $410_2$ from inverter ATRU $400_1$. Similarly, if inverter ATRU $400_1$ is not operating (e.g., taken off line or has failed), the controller (not shown) opens breaker $404_1$ and closes each of the transfer bus breakers $412_1$, $412_2$ to provide power to critical 230 Vrms ac load $402_1$ from inverter ATRU $400_2$.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

What is claimed is:

1. An electric power system comprising:
a three-phase to ten-phase step-up transformer comprising:
a plurality of primary winding groupings, each primary winding grouping including a plurality of sub-primary windings coupled in series with a junction of two sub primary windings defining an interior junction, wherein each end of a primary winding grouping is connected to an end of another primary winding grouping to form a delta configuration and a junction of two primary winding groupings defines an input phase connection that receives a phase of a multi-phase input voltage;
a plurality of secondary windings, each secondary winding having a first end and a second end with a first end coupled to one of the plurality of sub-primary windings and a second end coupled to one of a plurality of third windings or one of ten outputs of the three-phase to ten-phase step-up transformer; and
the plurality of the third windings each having a first end and a second end, wherein the first end of a third winding is coupled to a second end of one of the plurality of secondary windings and the second end is coupled to one of the ten outputs of the three-phase to ten-phase step-up transformer;
wherein each of the plurality of secondary windings and the plurality of third windings are configured such that an output voltage at each output is higher than an input voltage applied to the input phase connection;
a plurality of sets of diode pairs with each set of diode pairs having a first end, a second end, and an inner connection, each of the plurality of sets of diode pairs having the first end connected to a positive dc bus, the second end connected to a negative dc bus and the inner connection connected to one of the ten outputs of the three-phase to ten-phase step-up transformer;
a three phase inverter connected to the positive dc bus and the negative dc bus; and
wherein the plurality of the sets of diode pairs operatively rectify the output voltage from the three-phase to ten-phase step-up transformer to form a DC voltage on the positive dc bus and the negative dc bus with a reduced common mode voltage.

2. The electric power system of claim 1, further comprising:
a power source comprising a three phase input voltage from a variable frequency constant voltage generator, wherein each input phase connection of the three-phase to ten-phase step-up transformer operatively receives a phase from the variable frequency constant voltage generator.

3. The electric power system of claim 2 further comprising:
an input bus breaker connected between the power source and the input phase connection of the three-phase to ten-phase step-up transformer.

4. The electric power system of claim 1, further comprising:
a first transfer bus operatively connected to an output of the three phase inverter and to at least one electric power load; and
a second transfer bus connected between the first transfer bus and at least one second electric power load.

5. The electric power system of claim 4 further comprising:
an output bus breaker connected between the first transfer bus and the output of the three phase inverter.

6. The electric power system of claim 1 further comprising
a second three-phase to ten-phase step-up transformer;
a plurality of sets of second diode pairs with each set of second diode pairs having a second first end, a second second end, and a second inner connection, each of the plurality of sets of second diode pairs having the second first end connected to a second positive dc bus, the second second end connected to a second negative dc bus and the second inner connection connected to one of the ten outputs of the second three-phase to ten-phase step-up transformer; and
a second three phase inverter connected to the second positive dc bus and the second negative dc bus.

7. The electric power system of claim 6 further comprising a second transfer bus connected between an output of the second three phase inverter and at least one electric power load.

8. The electric power system of claim 7 further comprising at least one transfer bus breaker between an output bus breaker connected to each output phase of the three phase inverter and the second transfer bus.

9. The electric power system of claim 8 further comprising a second output bus breaker connected between the output phase of the second three phase inverter and the second transfer bus.

10. The electric power system of claim 6, further comprising:
a second power source comprising a second three phase input voltage from a second variable frequency constant voltage generator, wherein each input phase connection of the second three-phase to ten-phase step-up transformer operatively receives a phase from the second variable frequency constant voltage generator.

11. A method to provide three phase power to equipment with reduced common mode voltage on a DC bus of a three phase inverter, the method comprising:
connecting a three-phase to ten-phase step-up transformer to ten sets of diode pairs with each set of diode pairs having a first end, a second end, and an inner connection connecting diodes of the set of diode pairs to each other, the three-phase to ten-phase step-up transformer comprising:
a plurality of primary winding groupings, each primary winding grouping including a plurality of sub-primary windings coupled in series with a junction of two sub primary windings defining an interior junction, wherein each end of a primary winding grouping is connected to an end of another primary winding grouping to form a delta configuration and a junction of two primary winding groupings defines an input phase connection that receives a phase of a multi-phase input voltage;
a plurality of secondary windings, each secondary winding having a first end and a second end with a first end coupled to one of the plurality of sub-primary windings and a second end coupled to one of a plurality of third windings or one of ten output connections of the three-phase to ten-phase step-up transformer;

the plurality of the third windings each having a first end and a second end, wherein the first end of a third winding is coupled to a second end of one of the plurality of secondary windings and the second end is coupled to one of the ten output connections of the three-phase to ten-phase step-up transformer, wherein each of the plurality of secondary windings and the plurality of third windings are configured such that an output voltage at each of the output connections is higher than an input voltage applied to the input phase connection;

for each output connection of the ten outputs of the three-phase to ten-phase step-up transformer, connecting the output connection to an inner connection of one of the ten sets of diode pairs;

connecting each first end of the ten sets of diode pairs to each other and to switches of the three phase inverter; and connecting each second end of the ten sets of diode pairs to each other and to other switches of the three phase inverter, wherein the ten sets of diode pairs operatively rectify the output voltage from the three-phase to ten-phase step-up transformer to form a DC voltage on a DC bus with a reduced common mode voltage.

12. The method of claim 11 wherein the multi-phase input voltage comprises a three phase input voltage from a variable frequency constant voltage generator, the method further comprising connecting each input phase connection to a phase of the variable frequency constant voltage generator.

13. The method of claim 12 further comprising:
connecting each output phase of the three phase inverter to a transfer bus to provide power to equipment operatively connected to the transfer bus during operation and
connecting the transfer bus to a second transfer bus connected to at least one second load.

14. The method of claim 13 further comprising connecting an output bus breaker between the transfer bus and each output phase of the three phase inverter.

15. The method of claim 13 wherein each output phase of the three phase inverter is operatively connected to at least one transfer bus of a plurality of transfer busses each connected to at least one load, the method further comprising that when one of the at least one transfer bus is operatively connected to the output phase of the three phase inverter, providing power to the at least one load connected to the one of the at least one transfer bus.

16. The method of claim 11 wherein the multi-phase input voltage comprises a three phase input voltage from a plurality of variable frequency constant voltage generators, the method further comprising connecting each input phase connection to receive a phase from a selected one of the variable frequency constant voltage generators.

17. The method of claim 11 further comprising:
connecting a second three-phase to ten-phase step-up transformer to ten sets of second diode pairs with each set of second diode pairs having a second first end, a second second end, and a second inner connection;

for each output of ten outputs of the second three-phase to ten-phase transformer, connecting the output to an inner connection of one of the ten sets of second diode pairs;

connecting each second first end of the ten sets of second diode pairs to each other and to switches of a second three phase inverter;

connecting each second second end of the ten sets of second diode pairs to each other and to other switches of the second three phase inverter; and connecting an output phase of the second three phase inverter to a second transfer bus to provide power to equipment operatively connected to the second transfer bus.

18. The method of claim 17 further comprising:
operatively connecting, via at least one bus breaker, the second transfer bus to each output phase of the second three phase inverter.

19. The method of claim 18 further comprising:
operatively connecting a transfer bus connected to each output phase of the three phase inverter and the second transfer bus to respective electric power loads.

20. The method of claim 11 further comprising:
installing the three-phase to ten-phase step-up transformer, the ten sets of diode pairs and the three phase inverter in an aircraft platform.

* * * * *